(12) United States Patent
Mittal et al.

(10) Patent No.: US 8,370,552 B2
(45) Date of Patent: Feb. 5, 2013

(54) PRIORITY BASED BUS ARBITERS AVOIDING DEADLOCK AND STARVATION ON BUSES THAT SUPPORT RETRYING OF TRANSACTIONS

(75) Inventors: Aditya Mittal, Haryana (IN); Mrudula Kanuri, Bangalore (IN); Venkata Malladi, Bangalore (IN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 12/250,566

(22) Filed: Oct. 14, 2008

(65) Prior Publication Data

US 2010/0095036 A1 Apr. 15, 2010

(51) Int. Cl.
*G06F 13/36* (2006.01)
(52) U.S. Cl. .................................. 710/113; 710/112
(58) Field of Classification Search .......... 710/111–119, 710/240–244
See application file for complete search history.

(56) References Cited

U.S. PATENT DOCUMENTS

| | | | |
|---|---|---|---|
| 5,455,913 A | 10/1995 | Shrock et al. | |
| 5,546,548 A | 8/1996 | Chen et al. | |
| 5,649,230 A | 7/1997 | Lentz | |
| 5,717,954 A | 2/1998 | Grieff et al. | |
| 5,761,468 A | 6/1998 | Emberson | |
| 5,768,548 A | 6/1998 | Young et al. | |
| 5,790,817 A | 8/1998 | Asghar et al. | |
| 5,822,568 A | 10/1998 | Swanstrom | |
| 5,864,876 A | 1/1999 | Rossum et al. | |
| 5,881,248 A | 3/1999 | Mergard | |
| 5,923,859 A | 7/1999 | Melo et al. | |
| 5,940,866 A | 8/1999 | Chisholm et al. | |
| 5,968,143 A | 10/1999 | Chisholm et al. | |
| 6,016,528 A * | 1/2000 | Jaramillo et al. | 710/243 |
| 6,018,803 A | 1/2000 | Kardach | |
| 6,029,223 A | 2/2000 | Klein | |
| 6,029,228 A | 2/2000 | Cai et al. | |
| 6,085,276 A | 7/2000 | VanDoren et al. | |
| 6,085,278 A | 7/2000 | Gates et al. | |
| 6,098,114 A | 8/2000 | McDonald et al. | |
| 6,101,568 A | 8/2000 | Richardson | |
| 6,157,980 A | 12/2000 | Arimilli et al. | |
| 6,175,634 B1 | 1/2001 | Graumann | |
| 6,182,112 B1 | 1/2001 | Malek et al. | |
| 6,185,634 B1 | 2/2001 | Wilcox | |
| 6,205,524 B1* | 3/2001 | Ng | 711/151 |
| 6,226,695 B1 | 5/2001 | Kaiser et al. | |
| 6,233,656 B1 | 5/2001 | Jones et al. | |
| 6,266,742 B1 | 7/2001 | Challenger et al. | |
| 6,298,407 B1 | 10/2001 | Davis et al. | |

(Continued)

OTHER PUBLICATIONS

Brandt, Scott, "Module 2: Computer-System Structure" Spring 2001, http://www/spe/icsc/edif-sbrandt/courses/Spring01/111/slides/mod2.1.pdf.

(Continued)

*Primary Examiner* — Raymond Phan

(57) ABSTRACT

A scheduler provided according to an aspect of the present invention provides higher priority for data units in a low priority queue upon occurrence of a starvation condition, and to packets in a high priority queue otherwise. The scheduler permits retransmission of a data unit in the lower priority queue when in the starvation condition, but clears the starvation condition when the data unit is retransmitted a pre-specified number of times. As a result, the data units in the higher priority queue would continue to be processed, thereby avoiding a deadlock at least in certain situations.

18 Claims, 4 Drawing Sheets

U.S. PATENT DOCUMENTS

| | | | |
|---|---|---|---|
| 6,314,472 B1 | 11/2001 | Trieu et al. | |
| 6,345,341 B1 | 2/2002 | Arimilli et al. | |
| 6,397,296 B1 | 5/2002 | Werner | |
| 6,418,496 B2 * | 7/2002 | Pawlowski et al. | 710/264 |
| 6,442,634 B2 | 8/2002 | Bronson et al. | |
| 6,480,939 B2 | 11/2002 | Anderson et al. | |
| 6,526,518 B1 | 2/2003 | Catlin et al. | |
| 6,560,657 B1 | 5/2003 | Gandhi et al. | |
| 6,571,318 B1 | 5/2003 | Sander et al. | |
| 6,574,712 B1 | 6/2003 | Kahle et al. | |
| 6,578,102 B1 | 6/2003 | Batchelor et al. | |
| 6,631,434 B1 | 10/2003 | Johnson et al. | |
| 6,681,281 B1 | 1/2004 | Maleck | |
| 6,681,285 B1 * | 1/2004 | Ng | 710/309 |
| 6,696,854 B2 | 2/2004 | Momtaz et al. | |
| 6,696,954 B2 | 2/2004 | Chung | |
| 6,745,258 B1 | 6/2004 | Pellegrino et al. | |
| 6,751,038 B1 | 6/2004 | Wada | |
| 6,754,755 B1 | 6/2004 | Johnson et al. | |
| 6,782,457 B2 | 8/2004 | Hill et al. | |
| 6,801,963 B2 | 10/2004 | Smith et al. | |
| 6,842,803 B2 | 1/2005 | Schmidt et al. | |
| 6,877,048 B2 | 4/2005 | Bilak et al. | |
| 6,898,649 B2 * | 5/2005 | Goudie | 710/112 |
| 6,901,467 B2 | 5/2005 | Shah et al. | |
| 6,904,473 B1 | 6/2005 | Bloxham et al. | |
| 6,907,480 B2 | 6/2005 | Takei et al. | |
| 6,910,106 B2 | 6/2005 | Sechrest et al. | |
| 6,915,363 B2 | 7/2005 | Wood et al. | |
| 6,950,892 B2 | 9/2005 | Bell, Jr. et al. | |
| 6,957,290 B1 * | 10/2005 | Rowlands et al. | 710/240 |
| 6,996,684 B2 | 2/2006 | Tseng et al. | |
| 6,999,426 B2 | 2/2006 | Miyoshi | |
| 7,032,046 B2 | 4/2006 | Horii et al. | |
| 7,096,291 B2 | 8/2006 | Lin | |
| 7,124,232 B2 * | 10/2006 | Takeda et al. | 710/310 |
| 7,139,878 B2 | 11/2006 | Malik et al. | |
| 7,143,219 B1 * | 11/2006 | Chaudhari et al. | 710/111 |
| 7,177,985 B1 | 2/2007 | Diefendorff | |
| 7,263,566 B2 | 8/2007 | Ganasan et al. | |
| 7,376,846 B2 | 5/2008 | Hawkins et al. | |
| 7,389,466 B1 | 6/2008 | Harmer et al. | |
| 7,505,461 B2 | 3/2009 | Matsuda et al. | |
| 7,525,986 B2 * | 4/2009 | Lee et al. | 370/462 |
| 7,600,058 B1 | 10/2009 | Danilak | |
| 7,706,756 B2 | 4/2010 | Sato et al. | |
| 7,895,385 B2 | 2/2011 | Raju | |
| 2001/0001873 A1 | 5/2001 | Wickeraad et al. | |
| 2001/0014928 A1 | 8/2001 | Chrysos et al. | |
| 2002/0023204 A1 | 2/2002 | Barowski et al. | |
| 2002/0056027 A1 | 5/2002 | Kanai et al. | |
| 2002/0144054 A1 | 10/2002 | Fanning et al. | |
| 2003/0126355 A1 | 7/2003 | David | |
| 2003/0191880 A1 | 10/2003 | Lin | |
| 2003/0229743 A1 * | 12/2003 | Brown | 710/113 |
| 2003/0229762 A1 | 12/2003 | Maiyuran et al. | |
| 2004/0024947 A1 | 2/2004 | Barth et al. | |
| 2004/0024948 A1 | 2/2004 | Winkler et al. | |
| 2004/0049641 A1 | 3/2004 | So et al. | |
| 2004/0064649 A1 | 4/2004 | Volpe et al. | |
| 2004/0083341 A1 | 4/2004 | Robinson et al. | |
| 2004/0088458 A1 | 5/2004 | Tomlinson et al. | |
| 2004/0117606 A1 | 6/2004 | Wang et al. | |
| 2004/0123043 A1 | 6/2004 | Rotithor et al. | |
| 2004/0201647 A1 | 10/2004 | Jackson Pulver et al. | |
| 2005/0081014 A1 | 4/2005 | Tran et al. | |
| 2005/0138254 A1 | 6/2005 | Raghavan et al. | |
| 2005/0216607 A1 | 9/2005 | Munguia | |
| 2006/0041721 A1 | 2/2006 | Hakura et al. | |
| 2006/0041722 A1 | 2/2006 | Hakura et al. | |
| 2006/0041723 A1 | 2/2006 | Hakura et al. | |
| 2006/0095677 A1 | 5/2006 | Hakura et al. | |
| 2007/0198758 A1 | 8/2007 | Asano et al. | |
| 2009/0055566 A1 | 2/2009 | Reinig et al. | |
| 2009/0089477 A1 | 4/2009 | Reed | |
| 2009/0228631 A1 | 9/2009 | Marulkar et al. | |
| 2010/0057973 A1 | 3/2010 | Barake et al. | |

OTHER PUBLICATIONS

"Battery Charging Specification", "USB Implementers Forum, Inc.", Dated: Mar. 8, 2007, pp. 1-29, Revision 1.0.

"Device Class Specification Adopters Agreement", Downloaded Circa: Mar. 10, 2007, pp. 1-5.

Friths, "Multi-Level Memory Prefetching for Media and Stream Processing", Proceedings. 2002 IEEE International Conference on Multimedia and Expo, 2002. ICME '02. vol. 2, Aug. 26-29, 2002.

Carter et al., "Impulse: Building a Smarter Memory Controller". Proceedings, Fifth International Symposiun on High Performance Computer Architecture. Jan. 9-13, 1999.

"Using Spin-Loops on Intel Pentium 4 Processor and Intel Xeon Processor", Version 2.1, 0512001.

Jouppi, N. P., "Improving Direct-Mapped Cache Performance by the Addition of a Small Fully-Associative Cache and Prefetch Buffers", Proceedings. 17th Annual International Symposium on Computer Architecture, 1990. May 28-31, 1990.

* cited by examiner

PRIORITY BASED BUS ARBITERS AVOIDING DEADLOCK AND STARVATION ON BUSES THAT SUPPORT RETRYING OF TRANSACTIONS

BACKGROUND

1. Field of Disclosure

The present invention relates to bus arbiters and more specifically to bus arbiters avoidance of deadlocks and starvation on buses that support retrying of transactions.

2. Related Art

A bus refers to a communication path shared by multiple components of the same system to transfer data units. Queues are often employed to buffer the various data units before being sent to the respective target components. Such buffering is required typically due to the various bottlenecks in delivering the data units to respective target components.

Queues with different priorities may be employed, usually to ensure that more critical data units are forwarded sooner than those that do not have that degree of criticality/importance. Usually, the queuing approach (e.g., First-in-first out, last-in-first-out, etc.) of that particular queue determines the data unit that should be forwarded next from that queue.

Arbiters are used to select one of the queues from which a data unit is to be next transmitted. In general, arbiters need to ensure that lower priority queues are not starved and no deadlocks occur. As is well known, starvation implies that the lower priority queues are not provided a turn to transmit within a reasonable duration of time. On the other hand deadlocks refer to a situation in which each of a set of components is waiting for respective events from another component in a circular fashion, such that none of the events happen.

Various aspects of the present invention help achieve such objectives as described below in further detail.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A scheduler provided according to an aspect of the present invention provides higher priority for data units in a low priority queue upon occurrence of a starvation condition, and to packets in a high priority queue otherwise. The scheduler permits retransmission of a data unit in the lower priority queue when in the starvation condition, but clears the starvation condition when the data unit is retransmitted a pre-specified number of times.

As a result, the data units in the higher priority queue would continue to be processed, thereby avoiding a deadlock at least in certain situations.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Digital Processing System

Figure 1:
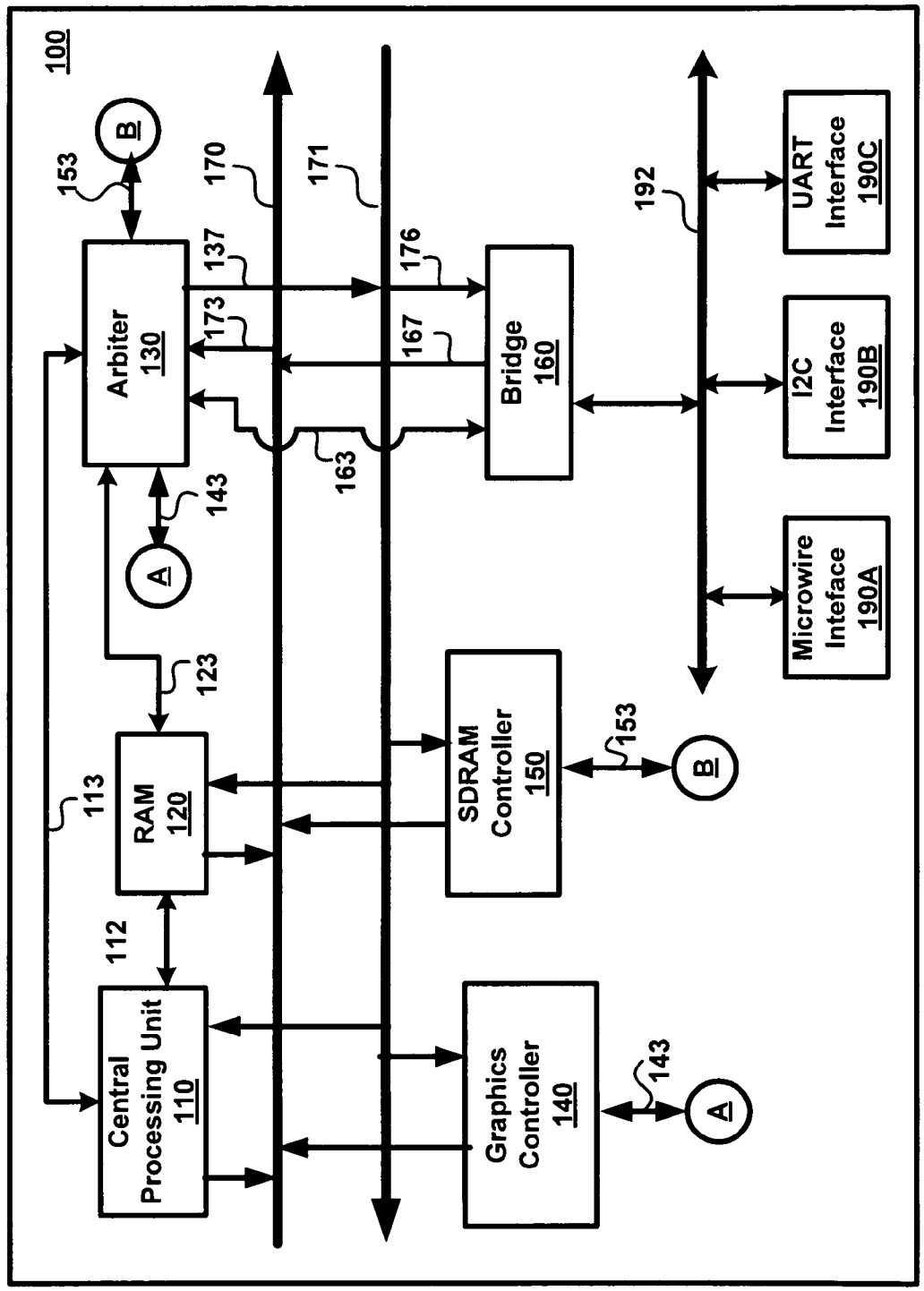
FIG. 1 is a block diagram of an example digital processing system in which several aspects of the present invention can be implemented.

FIG. 1 is a block diagram illustrating the details of an example digital processing system in which several aspects of the present invention can be implemented. The system is shown containing central processing unit (CPU) 110, random access memory (RAM) 120, arbiter 130, graphics controller 140, SDRAM controller 150, bridge 160, micro-wire interface 190A, I2C interface 190B, UART interface 190C, uni-directional buses 170 and 171, and bi-directional bus 192. Each block is described in further detail below.

Up-bus 170 is a unidirectional bus used by connected components (110, 120, 130, 140, 150 and 160) to send data units to arbiter 130, which in turn uses down-bus 171 to transfer each data unit back to the target component according to the destination address in the data unit. 'Unidirectional' implies merely the direction of transfer of data. However, each unidirectional bus can contain control signals which are in the reverse direction, as described in sections below.

Due to the use of two buses in either direction, a data unit may be received by arbiter 130, while another data unit is being transmitted simultaneously. The two unidirectional buses may be implemented using protocols such as those described in HyperTransport specification, well known in the relevant arts.

Each data unit is one of a pre-specified number of fixed sizes according to the protocol. Further, the unidirectional buses may operate according to a (potentially common) clock signal, having a sequence of clock periods. Each period may be viewed as a time slot and only a single data unit is transmitted in one time slot on either of the unidirectional buses. As described below, arbiter 130 determines the manner in which the unidirectional buses are used in each time slot, according to several aspects of the present invention.

Bus 192 represents a (bi-directional) peripheral bus connecting slow speed peripheral interfaces 190A-190C via bridge 160. Each of the peripheral interfaces may in turn be connected to several peripheral devices (not shown). Bridge 160 permits transfer of digital values between the entities connected to bus 191 and the entities connected to bus 192.

With respect to communication between connected components 110/120/140/150/160 using the up/down unidirectional buses, a source/sending component first requests arbiter 130 for access to up-bus 170 by sending (e.g., asserting) a request on corresponding request/grant path 113/123/143/153/163, and only one of the requesting connected components is granted access to bus 170 in any one bus cycle. The grant may be communicated on a corresponding path to the granted component, though the grant path is logically shown as being included in the bi-directional paths 113, etc.

Alternatively, the request and grant (for up-bus 170) can be on respective paths (instead of a bi-directional path, as shown). Arbiter 130 receives the data units from sender systems and then transmits each data unit to the corresponding target component based on a destination address present in the corresponding data unit. The target components may consume/use the received data unit and generate additional data units to send to other components. The manner in which the transferred data units are used by the corresponding components is described briefly below.

CPU 110 executes the instructions stored in RAM 120 to implement various user applications. Data in RAM 120 or SDRAMs (not shown) accessible via SDRAM controller 150 may be used while executing the instructions. A direct path 112 is shown provided between CPU 110 and RAM 120 such that the up/down paths need not be used for communication between the two components.

Graphics controller 140 receives (on bus 191 from CPU 110) pixel values representing image frames and generates display signals to display the image frames on a display unit (not shown). SDRAM 150 provides additional storage for any of the components, as required in the specific situations.

Bridge 160 provides connectivity between the slow devices connected to respective interfaces 190A-190C via path 192. In general, bridge 160 receives data units on one of the two buses 171/192, and transmits to the other side (on one of buses 192/170) to provide connectivity to the slow speed peripheral connected to the interfaces 190A-190C.

As noted above, arbiter 130 provides connectivity between the connected devices (except RAM 120 and CPU 110). Several features of the present invention enable the arbiter to be implemented at least with reduced probability for deadlocks and starvation for data units in the context of a multi-priority queue. The features will be clearer in the context of an example implementation of arbiter and in comparison with a prior approach, and accordingly the description is continued with respect to both.

3. Arbiter

Figure 2:
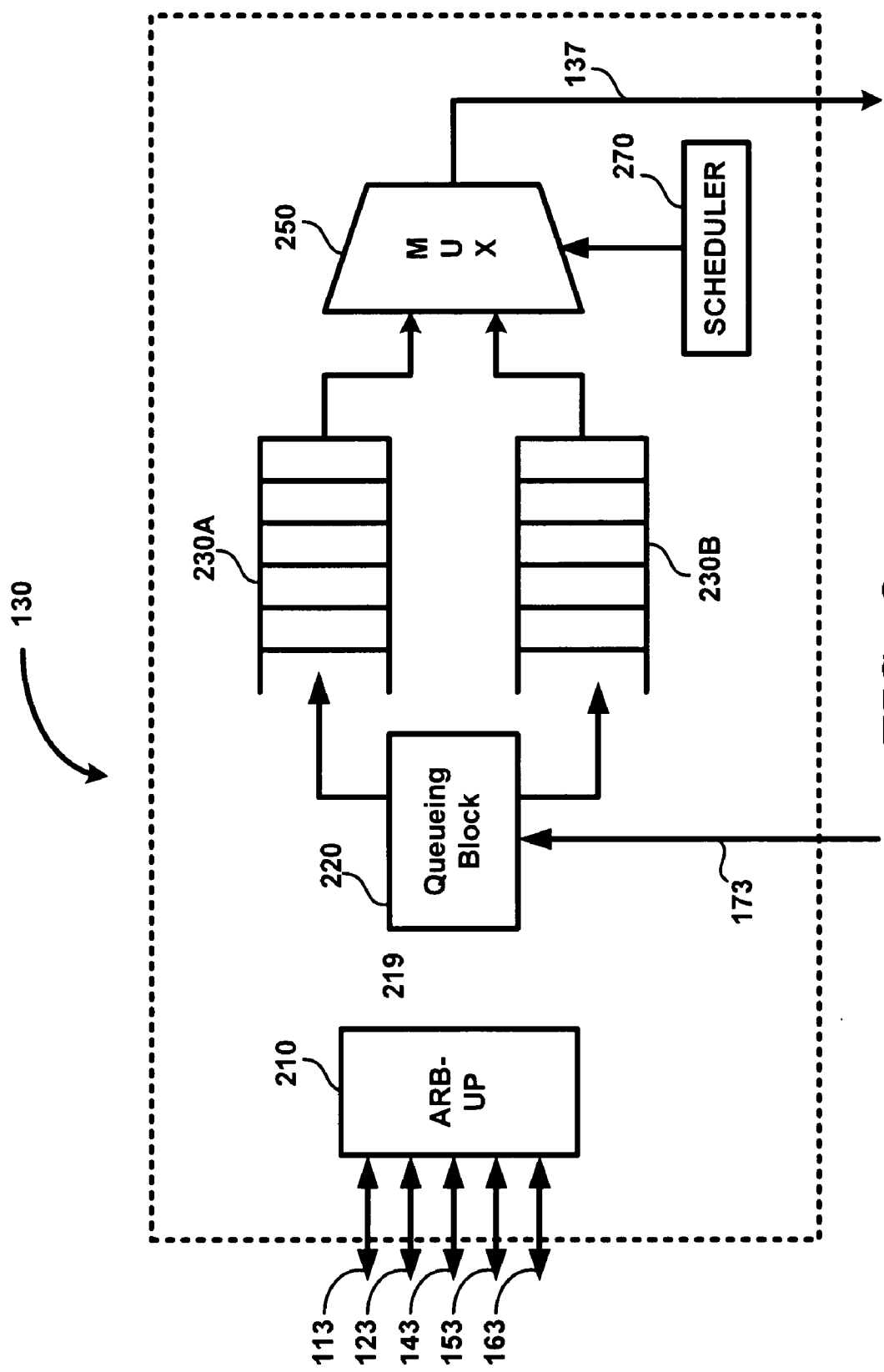
FIG. 2 is a block diagram illustrating the details of an arbiter in one embodiment.
Figure 3:
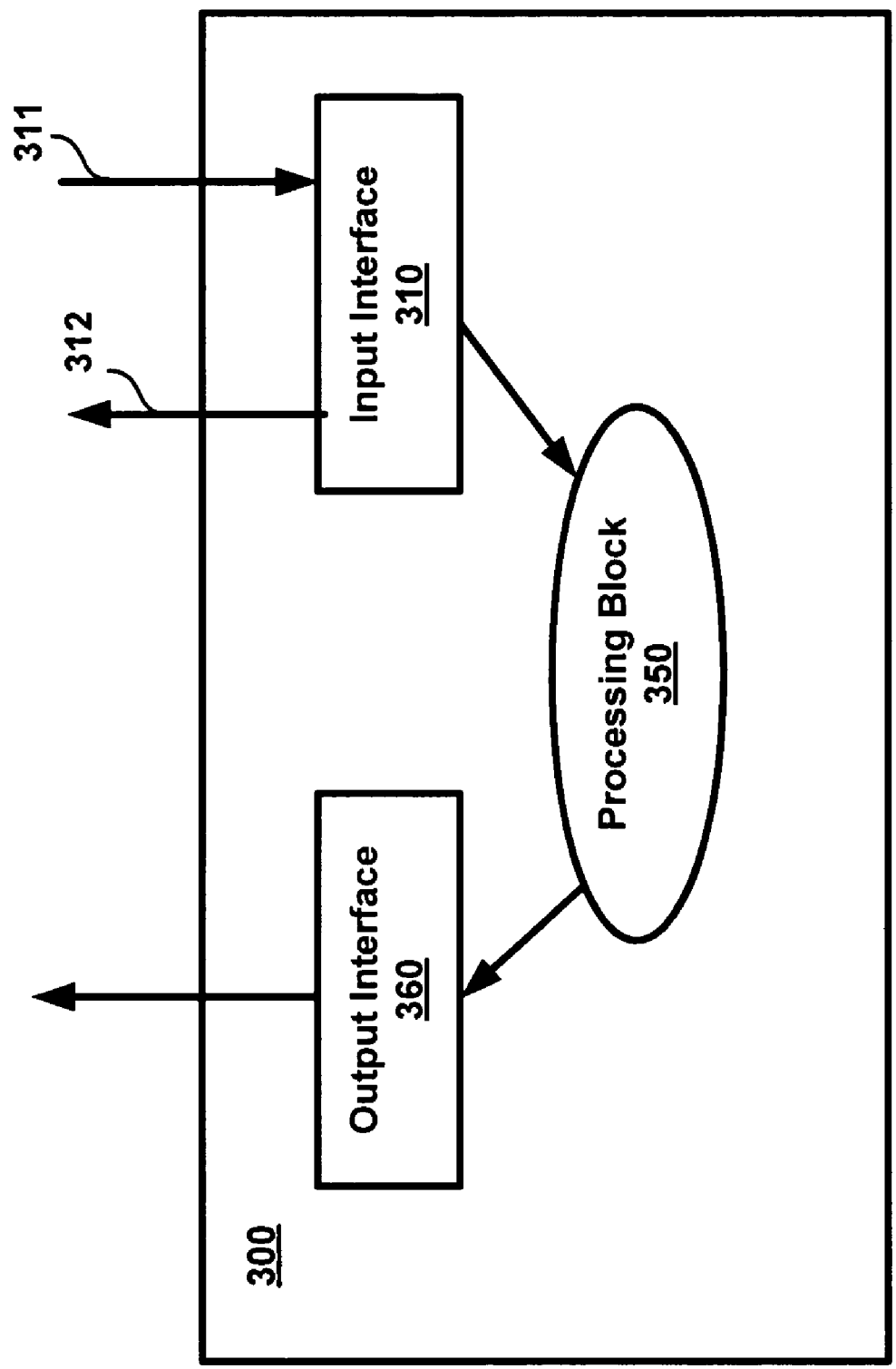
FIG. 3 is a block diagram illustrating the details of a component interfacing with an arbiter in one embodiment.

FIG. 2 is a block diagram illustrating the details of arbiter 130 in one embodiment. As shown there, arbiter 130 is shown containing up-arbiter 210, queuing block 220, queues 230A and 230B, multiplexor 250 and scheduler 270. Up-arbiter 210 grants up-bus 170 to one of the requesting one of components (as indicated in the corresponding paths 113, 123, 143, 153 and 163). The grant to the granted component may be indicated on the same path and thus only one of the paths may be communicated the grant for any given cycle.

Once a grant is received, the receiving component may use up-bus 170 to send the corresponding data unit to arbiter 130. Up-arbiter 210 may be implemented in a known way. The remaining components of FIG. 2 together may be considered as a down arbiter as described below in further detail.

Queuing block 220 queues each received data unit (on path 1723) in one of a high priority queue 230A and a low priority queue 230B. As may be appreciated, due to the use of queues, arbiter 130 may readily receive/buffer data units, while for successful completion of sending, the receiving/target component needs to acknowledge satisfactory receipt.

In an embodiment, data units containing control information (e.g., related to configuration) and/or those targeted to or sourced from specific components are configured for one specific priority. In general, data units that need to be quickly transferred may be placed in higher/high priority queue 220A and data units with relatively low criticality may be placed in low priority queue 220B.

Queues 230A and 230B may be supported by memory (circuit) internal to arbiter or external to arbiter. For illustration, each queue is assumed to be first in first out (FIFO), implying that a data unit placed first in the specific needs to be transferred out first. However, other queuing approaches (including timing out of certain data units, if held in the queue for a long time) can be implemented for each queue, as suited in the specific environment. Similarly, more queues may be employed in alternative embodiments, even though the description is provided with respect to 2 queues for illustration.

Scheduler 270 selects one of the queues for transmission in a next time slot (as defined by a clock signal, typically between two successive edges either of same or different direction). The queue selection is based on two criteria: (1) to give higher priority to data units in queue 230A; and (2) to avoid 'starvation' of the data units in queue 230B.

The data unit in the selected queue is transmitted on down-bus 171. However, the target component may request retransmission of the same data unit (for example, as not having sufficient buffer) by asserting the appropriate control signal on bus 171. Scheduler 270 may cause the data unit in the same queue to be retransmitted again upon such retransmission request (or non-acceptance). Such retransmission may cause deadlock in a prior approach as described below in further detail.

4. Deadlock in a Prior Arbiter

In a prior embodiment, starvation avoidance mechanism entails maintaining a starvation counter which is incremented each time a data unit from queue 230A is allocated a time slot, while there is a data unit in queue 230B, awaiting transmission. When the starvation counter reaches a certain pre-determined value (e.g., 7), queue 230B is selected even if there are data unit in queue 230A, awaiting transmission. The data unit in queue 230B is tried for retransmission until successfully delivered to the corresponding component. Such an approach may lead to deadlocks in certain situations as described below.

It is helpful to appreciate the general nature of how data units are used and generated in an embodiment of component 300 (which can correspond to any of components 110/120/140/150 and 160). Component 300 is shown containing input interface 310 to store data units (e.g., in an internal buffer) received on path 311 (can correspond to paths such as 176) from arbiter via bus 171, and to assert a retransmit line (path 312) when the received data unit cannot be stored or cannot otherwise be accepted. Processing block 350 generates new data units by using the data units received via input interface 310 and output interface 360 to store data units that are to be transmitted to other components via bus 170.

To illustrate some conditions in which deadlocks can occur, it is first assumed that for certain transaction types (e.g., configuration changes/writes), component 300 can process only a single incoming data unit, and the processing is complete only after the data unit produced from such processing is transmitted out of output interface 360. It is also assumed that the low priority request is sought to be sent next to component 300 from arbiter 130.

Thus, further assuming that the data unit thus produced by component 300 needs to be placed into high priority queue 230A and that queue 230A is full (as the scheduler is not able to come out of starvation mode and serve queue 230A), it may be appreciated that scheduler 270 would not be able to empty any data unit in the high priority queue 230A (since the data unit in the lower priority queue, would be retransmitted).

The retransmitted data unit would not be accepted by component 300 since the already produced data unit is not being delivered into high priority queue 230A. On the other hand, the low priority data unit cannot be transmitted to component 300 since it is not ready to accept the next data unit until the high priority data unit is successfully delivered to queue 230A. A deadlock accordingly results due to circular dependency thus created. A similar deadlock can also occur assuming a situation in which component 300 is out of buffer space for low priority data units.

Various aspects of the present invention provide for starvation mechanism, as well as avoid deadlocks at least in the situations noted above. The features of the invention are described with respect to example embodiments.

5. Selection without Deadlocks

Figure 4:
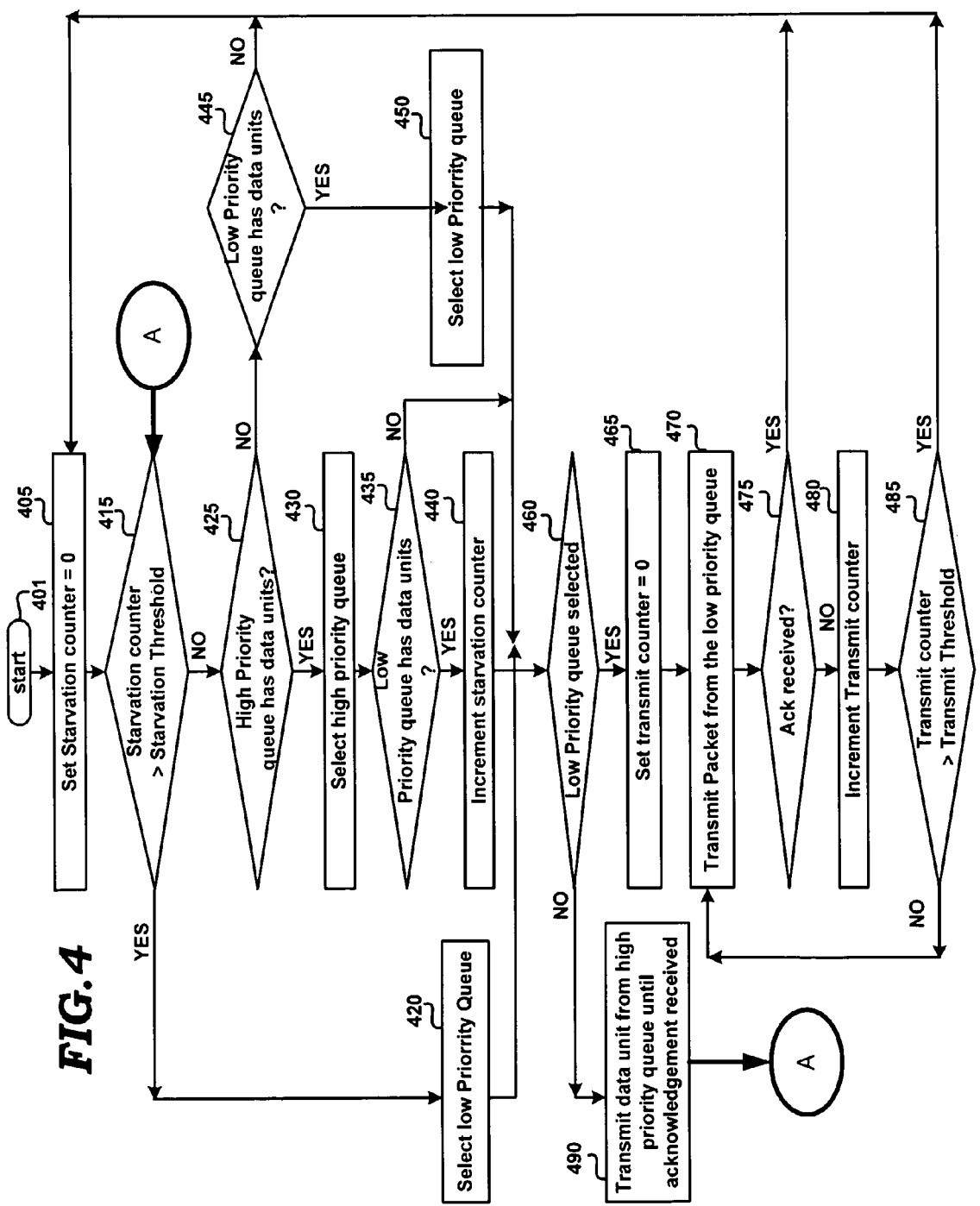
FIG. 4 is a flow chart illustrating the manner in which an arbiter sends data units to corresponding target components according to an aspect of the present invention.

FIG. 4 is a flowchart illustrating the manner in which an arbiter may select among queues with different priorities in an embodiment of the present invention. The flowchart is described with respect to FIGS. 1-2 merely for illustration. However, various features can be implemented in other environments and other components/blocks without departing from several aspects of the present invention. Furthermore, the steps are described in a specific sequence merely for illustration.

Alternative embodiments in other environments, using other components and different sequence of steps can also be implemented without departing from the scope and spirit of several aspects of the present invention, as will be apparent to one skilled in the relevant arts by reading the disclosure provided herein. The flowchart starts in step 401, in which control passes immediately to step 405.

In step 405, scheduler 270 sets a starvation counter to 0. In step 415, scheduler 270 determines whether starvation counter is greater than a starvation threshold. In case the comparison result is a yes, control passes to step 420, and otherwise to 425.

In step 420, scheduler 270 selects low priority queue 230B for transmission in the next clock cycle. Control then transfers to step 460.

In step 425, scheduler 270 checks whether high priority queue 230A has data units for transmission. If there are units awaiting transmission in queue 230A, control passes to step 430, or else to step 445.

In step 430, scheduler 270 selects high priority queue. Step 435 and 440 operate to increment the starvation counter if there are data units in low priority queue 230B also for transmission. Thus, starvation counter is incremented only when the low priority queue has data units to be transmitted and there are data units awaiting transmission. Control then transfers to step 460.

In step 445, scheduler 270 checks whether low priority queue has data units. Control passes to step 450 if there are data units and to step 405 otherwise. In other words, the starvation counter is reset each time there are no low priority data units awaiting transmission. In step 450, scheduler 270 selects low priority queue for transmission in the next clock cycle (time slot, in general). Control then transfers to step 460.

From the above, it may be appreciated that low priority queue is selected either when the counter has reached a threshold value (say 7) or when there are data units only in low priority queue 230B but not in high priority queue 230A. On the other hand, a higher priority queue is selected when starvation counter has not reached a corresponding threshold when there are data units to be transmitted/transferred.

In step 460, scheduler 270 checks whether a low priority queue selected, in which case control transfers to step 465, or else to step 490. In step 490, scheduler 270 transmits the data unit from high priority queue 420A until acknowledgement received. Thus, the same data unit may be retransmitted multiple times if retransmit request is received on path 312. Control is then transferred to step 415.

In step 465, scheduler 270 sets transmit counter=0. In step 470, scheduler 270 transmits a data unit from the low priority queue. In step 475, scheduler 270 checks whether an acknowledgement (or absence of the retransmit request noted above) is received from component 300. Control transfers to step 405 in case of successful sending (ack received) and to step 480 otherwise.

In step 480, scheduler 270 increments the transmit counter and in step 485 checks whether the transmit counter is greater than a pre-specified threshold. Control transfers to step 405, in case the retransmission is tried a number of times corresponding to the threshold, otherwise control transfers to step 470 to retry transmission.

Thus, according to an aspect of the present invention, steps 465, 470 and 475 operate to attempt to retransmit a low priority data unit only a pre-specified number of times. Upon continued failure for that many times, control is transferred to step 405 (in which starvation counter is reset), thereby causing the higher priority data units to be continued to be processed (thereby avoiding deadlocks).

Assuming that the transmit threshold is set to N (an integer), the arbiter would be in a starvation mode only for (N−1) retry periods. The starvation condition is cleared thereafter irrespective of whether the sending is successful (no retransmit request) or not (retransmit request continues to be asserted).

It should be further appreciated that the starvation counter based approach represents only an example approach to determine a condition when the lower priority queue is starved. Resetting the counter represents clearing the starvation condition. Alternative approaches to determine starvation condition and to clear the same, will be apparent to one skilled in the relevant arts by reading the disclosure provided herein. Such alternative solutions are contemplated to be covered several aspects of the present invention.

Similarly, though the description above is provided with respect to two priorities for illustration, more priorities can be used in alternative embodiments without departing from the scope and spirit of several aspects of the present invention.

6. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. An arbiter for use in a system, said system comprising a component configured to request retransmission of data units, said arbiter comprising:

a high priority queue and a low priority queue;

a queuing block to store a first set of data units in said high priority queue and a second set of data units in said low priority queue; and a scheduler to determine which of said queues is to be allocated time slots of a sequence of time slots, said scheduler to provide higher priority for said low priority queue upon occurrence of a predetermined condition for said low priority queue and to said high priority queue otherwise, wherein said scheduler retransmits a first data unit in said low priority queue for up to a pre-specified number of times in successive time slots before clearing said predetermined condition.

2. The arbiter of claim 1, wherein said scheduler is configured to maintain a counter and operable to increment said counter if a data unit is available in said low priority queue when a data unit from said high priority queue is transmitted on said bus, wherein said predetermined condition comprises said counter being equal to a second pre-specified number, wherein clearing said counter comprises resetting said counter to a third pre-specified value.

3. The arbiter of claim 2, wherein said arbiter comprises an up arbiter to receive corresponding requests from said plurality of components for an up bus, said up arbiter granting said up bus to only one of said plurality of components in a time slot, wherein the granted component transmits a corresponding data unit to said queuing block in said arbiter in the granted time slot.

4. The arbiter of claim 3, wherein said system further comprises a clock generator to generate a clock signal, said clock signal having a plurality of successive cycles, each time slot corresponding to one of said plurality of successive cycles.

5. The arbiter of claim 4, wherein said plurality of components are configured to request retransmission by asserting corresponding ones of retransmit request lines, wherein said scheduler is operable to examine the retransmit lines of said plurality components to determine whether to retransmit said first data unit.

6. A method implemented in an arbiter, said method comprising:
storing a first set of data units in a high priority queue and a second set of data units in a low priority queue;
determining which of said queues is to be allocated time slots of a sequence of time slots, wherein said determining comprises providing higher priority for said low priority queue upon occurrence of a predetermined condition for said low priority queue, and for said high priority queue otherwise;
transmitting a first data unit on a unidirectional bus to a first component and receiving a retransmit request in response; and
retransmitting said first data unit upon receiving said retransmit request,
wherein said first data unit is transmitted up to a pre-specified number of times in successive time slots before clearing said predetermined condition.

7. The method of claim 6, further comprising:
initializing a first counter to a start value;
incrementing said first counter if a data unit is available in said low priority queue when a data unit from said high priority queue is transmitted in a time slot,
wherein said predetermined condition comprises said first counter being equal to a second pre-specified number, wherein clearing said first counter comprises resetting said first counter to said start value.

8. The method of claim 6, further comprising:
receiving corresponding requests from a plurality of components for an up bus;
granting said up bus to only one of said plurality of components in each time slot; and
receiving a corresponding data unit from the granted component in the granted time slot,
wherein said storing stores each received data unit in one of said low priority queue and said high priority queue.

9. The method of claim 6, further comprising:
initializing a second counter to an initial value;
incrementing said second counter each time said first data unit is transmitted or retransmitted;
checking whether said second counter has reached a threshold value; and
setting said first counter to said start value if said second counter has reached said threshold value, thereby clearing said predetermined condition.

10. The method of claim 6, wherein said pre-specified number equals 1.

11. The method of claim 6, wherein said pre-specified number is an integer greater than or equal to 2.

12. A system comprising:
a plurality of components forming a plurality of data units, the data units to be transmitted to corresponding destination components of the plurality of components, wherein the destination components are configured to request retransmission of the data units; and
an arbiter operable to receive the plurality of data units and operable to transmit the plurality of data units to the corresponding destination components, wherein the arbiter comprises:
a high priority queue and a low priority queue, wherein the plurality of data units are stored in one of the high priority queue and the low priority queue; and
a scheduler operable to transmit, in a time slot, data units in the high priority queue with a higher priority compared to data units in the low priority queue, until the scheduler determines a predetermined condition exists for the low priority queue and causes a first data unit in the low priority queue to be transmitted, wherein the scheduler is operable to retransmit the first data unit up to a first predetermined number of attempts and then clear the predetermined condition, allowing a data unit in the high priority queue to be transmitted in a subsequent time slot.

13. The system of claim 12, further comprising an up bus and a down bus, wherein the up bus and down bus are unidirectional buses, wherein the arbiter is operable to transmit the plurality of data units to corresponding destination components on the down bus, and wherein the plurality of components send the plurality of data units to the arbiter on the up bus.

14. The system of claim 13, wherein the scheduler comprises a counter and increments the counter when a data unit is available in the low priority queue when a data unit from the high priority queue is transmitted, wherein the predetermined condition comprises the counter equal to a second predetermined number of attempts, and wherein clearing the predetermined condition comprises resetting the counter to a third predetermined value.

15. The system of claim 14, wherein the arbiter is operable to receive corresponding requests from the plurality of components for the up bus, the arbiter further operable to grant the up bus to only one of the plurality of components in a time slot, and wherein the granted component transmits a corresponding data unit to a queuing block of the arbiter for storing the corresponding data unit in one of the high priority queue and the low priority queue in the granted time slot.

16. The system of claim 15, further comprising a clock generator to generate a clock signal, the clock signal having a plurality of successive cycles, each time slot corresponding to one of the plurality of successive cycles.

17. The system of claim 16, wherein the plurality of components are configured to request retransmission by asserting a corresponding one of retransmit request lines, wherein the arbiter examines the retransmit line of the destination component to determine whether to retransmit the first data unit.

18. The system of claim 17, wherein the plurality of components comprises a random access memory (RAM), a processor, a bridge and a graphics controller.

* * * * *